United States Patent
Khamis et al.

(10) Patent No.: US 12,221,021 B2
(45) Date of Patent: Feb. 11, 2025

(54) ADAPTIVE PERSONAL THERMAL CONTROL IN A VEHICLE

(71) Applicant: GM Global Technology Operations LLC, Detroit, MI (US)

(72) Inventors: Alaa M. Khamis, Courtice (CA); Lei Li, Whitby (CA); Paul H. K. Hui, Oshawa (CA); Todd M. Tumas, Taylor, MI (US); Jarvis Chau, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 17/592,005

(22) Filed: Feb. 3, 2022

(65) Prior Publication Data
US 2023/0242019 A1    Aug. 3, 2023

(51) Int. Cl.
*B60N 2/56* (2006.01)
*B60W 40/08* (2012.01)

(52) U.S. Cl.
CPC ............ *B60N 2/56* (2013.01); *B60W 40/08* (2013.01); *B60W 2040/0872* (2013.01); *B60W 2540/21* (2020.02); *B60W 2540/221* (2020.02)

(58) Field of Classification Search
CPC . B60N 2/56; B60W 40/08; B60W 2040/0872; B60W 2540/21; B60W 2540/221; B62D 1/065
See application file for complete search history.

(56) References Cited

U.S. PATENT DOCUMENTS

| | | | |
|---|---|---|---|
| 10,803,687 B1 | 10/2020 | Khamis et al. | |
| 2014/0277765 A1* | 9/2014 | Karimi | G05B 15/02 700/276 |
| 2016/0061472 A1* | 3/2016 | Lee | F24F 11/64 700/276 |
| 2016/0320081 A1* | 11/2016 | Nikovski | G06F 16/2228 |
| 2019/0316799 A1* | 10/2019 | Bharatia | G06N 3/08 |
| 2021/0138871 A1* | 5/2021 | Yanagida | B60H 1/00742 |
| 2021/0190361 A1* | 6/2021 | Chae | F24F 11/46 |
| 2021/0276393 A1* | 9/2021 | Schumacher | B60H 1/00771 |

FOREIGN PATENT DOCUMENTS

WO   WO-2021216232 A1 * 10/2021 ........... B60H 1/0073

* cited by examiner

*Primary Examiner* — Khoi H Tran
*Assistant Examiner* — Tristan J Greiner
(74) *Attorney, Agent, or Firm* — CANTOR COLBURN LLP

(57) ABSTRACT

A system in a vehicle includes a personal thermal device. The personal thermal device provides heating or cooling to an individual occupant of the vehicle. The system also includes a controller implementing reinforcement learning to control the personal thermal device. The controller obtains states, from one or more sensors, indicating current conditions, to obtain a score that is determined according to the states and that represents a reward used in the reinforcement learning. The controller provides a stochastic policy indicating a probability of taking a particular action to control the personal thermal device based on the score acting as a feedback for feedback control of the personal thermal device using the reinforcement learning.

16 Claims, 3 Drawing Sheets

ADAPTIVE PERSONAL THERMAL CONTROL IN A VEHICLE

INTRODUCTION

The subject disclosure relates to adaptive personal thermal control in a vehicle.

Vehicles (e.g., automobiles, motorcycles, construction equipment, farm equipment) increasingly include features for the safety and comfort of occupants (i.e., driver or passenger). Exemplary safety features include alerts (e.g., lane departure alert) and semi-autonomous operations (e.g., collision avoidance system, automatic braking). Exemplary personal thermal devices include heated seats. Unlike the cabin temperature or another comfort feature within the vehicle that serves all the occupants, a personal thermal device is provided for the comfort of an individual occupant of the vehicle. Accordingly, it is desirable to provide adaptive personal thermal control in a vehicle.

SUMMARY

In one exemplary embodiment, a system in a vehicle includes a personal thermal device. The personal thermal device provides heating or cooling to an individual occupant of the vehicle. The system also includes a controller implementing reinforcement learning to control the personal thermal device. The controller obtains states, from one or more sensors, indicating current conditions. The controller obtains a score that is determined according to the states and that represents a reward used in the reinforcement learning. The controller provides a stochastic policy indicating a probability of taking a particular action to control the personal thermal device based on the score acting as a feedback for feedback control of the personal thermal device using the reinforcement learning.

In addition to one or more of the features described herein, the states include human influence factors (HIF) that are determined according to manual actions of the occupant or according to sentiment analysis.

In addition to one or more of the features described herein, the states that are determined according to the manual actions include time lapse or duration since adjustments made manually by the occupant to the personal thermal device or time lapse or duration since entry into or start of the vehicle by the occupant.

In addition to one or more of the features described herein, the states that are determined according to the sentiment analysis include an affect of the occupant determined by using a camera directed at a face of the occupant or a microphone recording a voice of the occupant or biometrics of the occupant.

In addition to one or more of the features described herein, the states include system influence factors (SIF) that are generally parameters affecting a temperature experienced by the occupant.

In addition to one or more of the features described herein, the states include context influence factors (CIF) that are not specific to the occupant.

In addition to one or more of the features described herein, the controller obtains the score by mapping the states to the score using a mapping function that is developed via machine learning.

In addition to one or more of the features described herein, the controller additionally uses a user profile specific to the occupant to obtain the score.

In addition to one or more of the features described herein, the personal thermal device is a heated or vented seat in which the occupant is seated.

In addition to one or more of the features described herein, the occupant is a driver of the vehicle and the personal thermal device is a heated or cooled steering wheel.

In another exemplary embodiment, a non-transitory computer-readable medium stores instructions which, when processed by one or more processors, implement a method in a vehicle. The method includes obtaining states, from one or more sensors, indicating current conditions, and obtaining a score that is determined according to the states and that represents a reward. The method also includes performing reinforcement learning to control a personal thermal device. The personal thermal device provides heating or cooling to an individual occupant of the vehicle and the reward is used in the reinforcement learning. A stochastic policy is provided to indicate a probability of taking a particular action to control the personal thermal device based on the score acting as a feedback for feedback control of the personal thermal device using the reinforcement learning.

In addition to one or more of the features described herein, the obtaining the states includes obtaining human influence factors (HIF) that are determined according to manual actions of the occupant or according to sentiment analysis.

In addition to one or more of the features described herein, the obtaining the states that are HIF that are determined according to the manual actions includes obtaining time lapse or duration since adjustments made manually by the occupant to the personal thermal device or time lapse or duration since entry into or start of the vehicle by the occupant.

In addition to one or more of the features described herein, the obtaining the states that are HIF that are determined according to the sentiment analysis includes obtaining an affect of the occupant determined by using a camera directed at a face of the occupant or a microphone recording a voice of the occupant or biometrics of the occupant.

In addition to one or more of the features described herein, the obtaining the states includes obtaining system influence factors (SIF) that are generally parameters affecting a temperature experienced by the occupant.

In addition to one or more of the features described herein, the obtaining the states includes obtaining context influence factors (CIF) that are not specific to the occupant.

In addition to one or more of the features described herein, the obtaining the score includes mapping the states to the score using a mapping function that is developed via machine learning.

In addition to one or more of the features described herein, the obtaining the score additionally includes using a user profile specific to the occupant.

In addition to one or more of the features described herein, the personal thermal device is a heated or vented seat in which the occupant is seated.

In addition to one or more of the features described herein, the occupant is a driver of the vehicle and the personal thermal device is a heated or cooled steering wheel.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
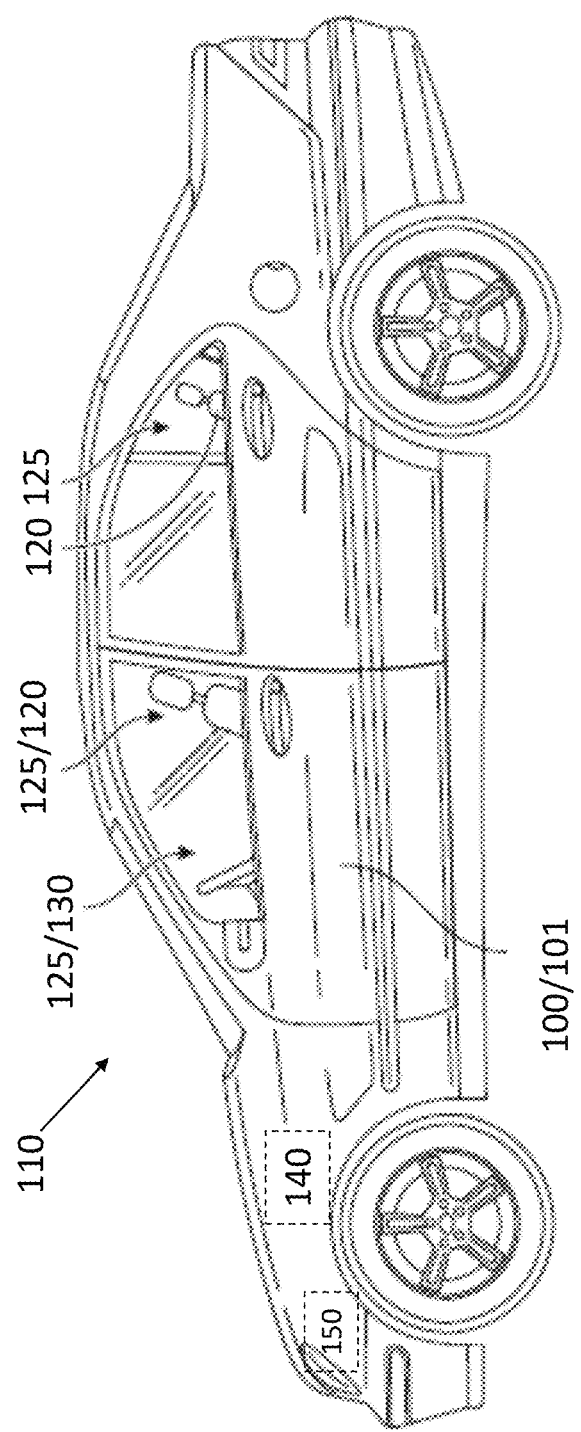
FIG. 1 illustrates a vehicle that includes adaptive personal thermal control according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to adaptive personal thermal control in a vehicle. As previously noted, personal thermal systems refer to systems that are designed for the comfort of an individual occupant. Exemplary personal thermal systems include heated seats, vented seats, a heated steering wheel, and a cooled steering wheel. A prior approach to controlling a personal thermal system involves an occupant making a manual selection or automatic control based on a predefined look-up table. However, an initial selection may no longer be comfortable or the occupant may have forgotten to activate a personal thermal system. According to one or more embodiments detailed herein, control of one or more personal thermal systems is performed automatically based on determining a quality of experience (QoX) score for the corresponding occupant.

In accordance with an exemplary embodiment, FIG. 1 illustrates a vehicle 100 that includes adaptive personal thermal control. The exemplary vehicle 100 shown in FIG. 1 is an automobile 101. The exemplary adaptive personal thermal system 110 of the vehicle 100 includes one or more seats 120, the steering wheel 130, and a controller 140. That is, the one or more seats 120 and steering wheel 130 may include heating elements (not shown) that radiate heat based on a flow of electricity. The one or more seats 120 may additionally or alternately include fans or blowers (not shown) that provide cooling of the surface of the seat 120. The steering wheel 130 may include a blower or thermo-electric reversible heat pump (not shown) to heat or cool fluid that circulates through it. While a seat 120 and steering wheel 130 are shown for the exemplary adaptive personal thermal system 110, alternate or additional adaptive personal thermal devices 125 that correspond with an occupant and that may controllably be heated or cooled may be adaptively controlled, as well.

The controller 140 may perform the adaptive personal thermal control according to one or more embodiments. That is, the controller 140 may control current through the heating elements or may control the fans, blowers, or heat pump based on a determination of the QoX score for the affected occupant, as discussed with reference to FIG. 2. For example, if the occupant is the driver of the vehicle 100, the controller 140 may control the heating elements or fans in the driver seat 120 and the steering wheel 130 based on a determination of the QoX score for the driver. The determination of QoX score may involve one or more sensors 150 (e.g., temperature sensor, humidity sensor, window position sensor, sunroof position sensor, vehicle speed sensor).

The controller 140 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 140 may include a non-transitory computer-readable medium that stores instructions which, when processed by one or more processors of the controller 140, implement a method of performing adaptive personal thermal control in a vehicle 100 according to one or more embodiments detailed herein.

Figure 2:
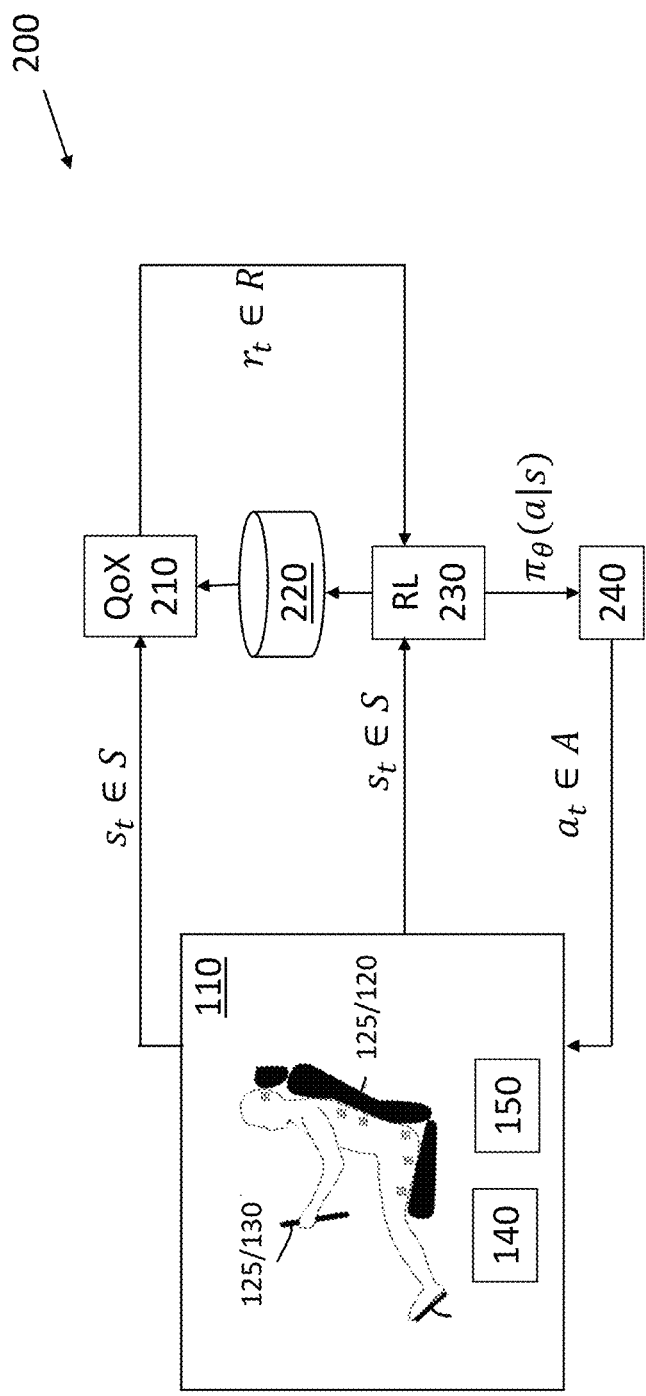
FIG. 2 is a process flow of a method of performing adaptive personal thermal control in a vehicle according to one or more embodiments.

FIG. 2 is a process flow of a method 200 of performing adaptive personal thermal control in a vehicle 100 according to one or more embodiments. The process flow shown in FIG. 2 may be repeated (i.e., performed separately) for each adaptive personal thermal device 125 (e.g., seat 120, steering wheel 130) of each occupant. An exemplary adaptive personal thermal system 110 is shown to include a heated seat 120 and a heated steering wheel 130. As previously noted, alternate or additional features (e.g., vented seat 120) and adaptive personal thermal devices 125 may be part of the adaptive personal thermal system 110. At block 210, a determination of the QoX score is made. The processes involved in this determination are detailed with reference to FIG. 3. The QoX score may be provided as a reward $r_t$ corresponding to an iteration timestep t from a set R of possible rewards, as indicated. An exemplary set R of rewards and corresponding scores may be: {comfortable (+1), too hot (−1), hot (−0.5), cold (−0.5), too cold (−1)}.

As shown and discussed with reference to FIG. 3, determination of the QoX score at block 210 may use information about the current adaptive personal thermal system 110 obtained from sensors 150. The information may be in the form of current states $s_t$ corresponding to an iteration timestep t from a set S of possible states, as indicated. An exemplary set S of states may include {seat thermocouple reading, interior air temperature, ambient temperature, windchill effect, interior humidity, ambient humidity, position of each window, sunroof position, vehicle speed, sun angle}. The set S of states may also include states based on the affect of the occupant such as {negative, neutral, positive} or on contextual information, as further discussed with reference to FIG. 3. The camera 305 discussed with reference to FIG. 3 may be used to obtain some of these states such as the affect of the occupant.

An occupant profile 220 developed and stored for the particular occupant may be used in the determination of the QoX score. This occupant profile 220 may be updated after each time the processes of the method 200 are performed for the occupant. The occupant may be identified in a number of ways. For example, if the occupant is the driver, the key fob carried by the occupant may be used to identify the driver. As another example, an occupant may be identified based on a cellular device or other personal wireless device (e.g., wearable) of the occupant being connected to the infotainment system of the vehicle 100. The determination of the QoX score at block 210, provides a quantitative value used to implement a machine learning technique referred to as reinforcement learning (RL) at block 230.

The RL at block 230 may be model-free, with learning based directly from experience and iterations. An exemplary implementation of RL at block 230 may involve a temporal difference algorithm such as Asynchronous Advantage Actor-Critic (A3C). The RL at block 230 provides a stochastic policy $\pi_\theta(a|s)$, which is a probability of taking a particular action a given states s and parameters θ. Put another way, the controller 140 performs feedback control of a given adaptive personal thermal device 125 for each iteration of the method 200. Specifically, the states $s_t$ for the current timestep t are mapped to actions $a_t$ to be implemented by the controller 140 based on using the QoX score (i.e., reward) as feedback. The parameters θ are known parameters of the RL such as activation functions and weighting values.

At block 240, one or more actions $a_t$ among a set A of possible actions is selected, based on the stochastic policy provided by the RL at block 230. These actions $a_t$ are implemented by the controller 140. An exemplary set of actions includes {off, heat level 1, heat level 2, heat level 3, vent level 1, vent level 2, vent level 3}. The set A of possible actions may differ based on the specific adaptive personal thermal device 125 and its capabilities. For example, if the steering wheel 130 may be heated but cannot be cooled, the set A of possible actions $a_t$ may include {off, heat level 1, heat level 2, heat level 3} but no cooling actions. The processes shown in FIG. 2 may be performed iteratively (e.g., periodically) for each adaptive personal thermal device 125 in use.

Figure 3:
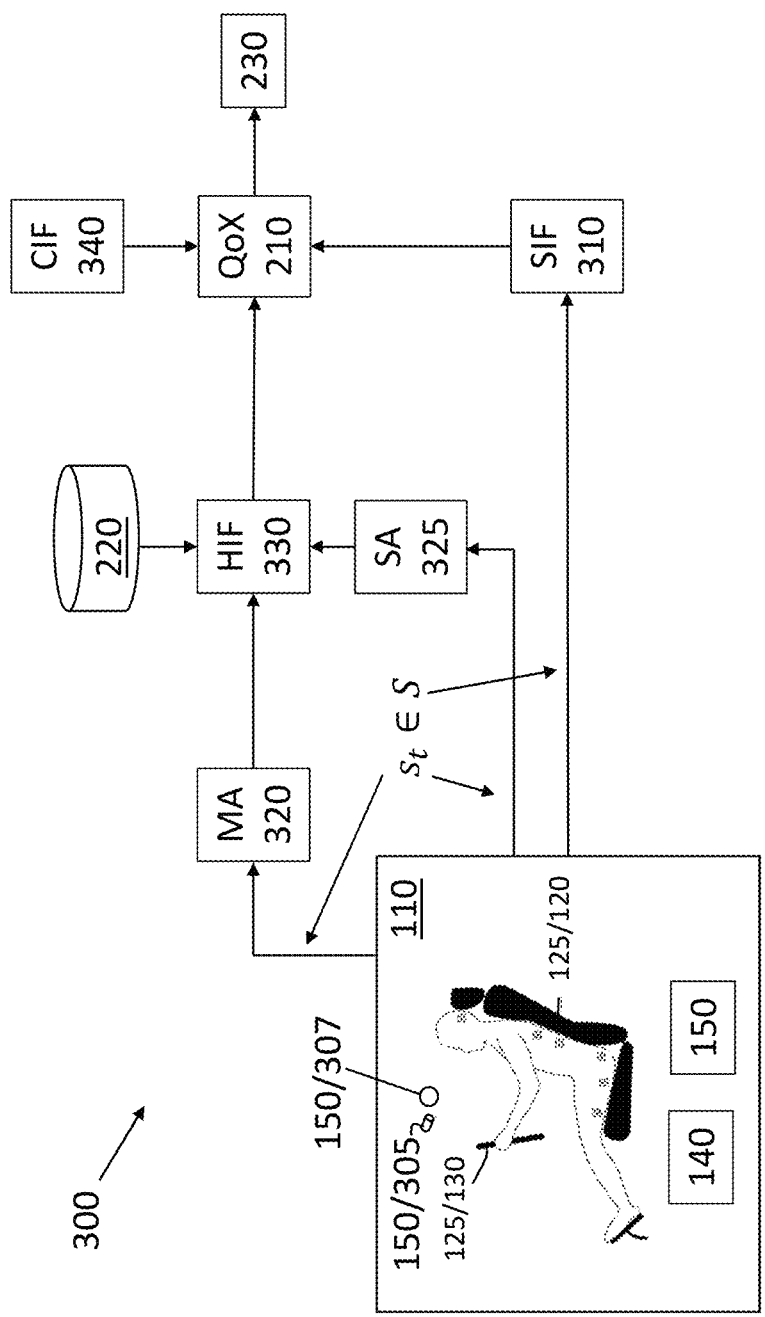
FIG. 3 is a process flow of a method of determining a quality of experience score as part of the process of performing adaptive personal thermal control in a vehicle according to one or more embodiments.

FIG. 3 is a process flow of a method 300 of determining the QoX score as part of the process of performing adaptive personal thermal control in a vehicle 100 according to one or more embodiments. FIG. 3 shows various factors that are considered in generating a QoX score. The factors include system influence factors (SIF) determined at block 310, human influence factors (HIF) determined at block 330, and context influence factors (CIF) determined at block 340. Each of the factors includes parameters that may be expressed as numerical (e.g., 0, 1) or categorial (e.g., good, bad, okay) value. As indicated, different states $s_t$ for the current iteration timestamp are used for different processes of the method 300. The parameters that are part of the SIF, HIF, and CIF are mapped to a QoX score at block 210 according to a mapping function that is developed via machine learning (i.e., by training a machine learning algorithm with data).

The system influence factors (SIF) determined at block 310 are some of the parameters obtained from sensors 150 of the vehicle 100 as the states $s_t$ for the current iteration timestamp. Generally, states $s_t$ categorized as SIF may be thought of as those that affect the temperature experienced by the occupant. The sensors 150 are known and are generally existing sensors 150 such that they need not be added for the adaptive personal thermal control. As previously noted, exemplary parameters include {seat thermocouple reading, interior air temperature, ambient temperature, interior humidity, ambient humidity, position of each window, sunroof position, vehicle speed, sun angle}.

The human influence factors (HIF) determined at block 330 are based on manual actions (MA) of the occupant, determined at block 320, and on sentiment analysis (SA), determined at block 325. The MA and SA uses some of the states $s_t$ for the current iteration timestamp, as indicated. Manual actions (MA), observed at block 320, refer to adjustments by the occupant of the adaptive personal thermal device 125 being controlled. As previously noted, implementation of the process flow according to FIGS. 2 and 3 is for a given adaptive personal thermal device 125 of a given occupant. Thus, at block 320, obtaining the parameters corresponding to manual actions refers to those performed by the given occupant for the given adaptive personal thermal device 125. Exemplary observed parameters (i.e., states $s_t$) associated with manual actions include time lapse or duration of the last setting adjustment or setting override by the occupant (e.g., time since the given occupant increased the heat setting on the seat 120), time lapse or duration since the last key cycle (e.g., time since the given occupant last started the vehicle 100), and time lapse or duration since occupancy (e.g., time since the given occupant entered the vehicle 100).

Sentiment analysis, at block 325, refers to the determination of verbal and non-verbal feedback provided by the occupant. As previously noted, the set S of states may include states $s_t$ based on the affect of the occupant such as {negative, neutral, positive} or contextual information. These states $s_t$ may be determined using sensors 150 such as the camera 305 and microphone 307, for example. The camera 305 shown directed at the face of the occupant (e.g., driver) may perform temperature screening (e.g., obtain a temperature of the occupant's face) as well as image processing (e.g., analyze the facial expression of the occupant). Additional sensors 150 may obtain biometrics (e.g., body temperature, heart rate).

As another part of the sentiment analysis at block 325, a microphone 307, which may be part of the infotainment system that is used for Bluetooth-connected operation of a cellular device, for example, may be used to obtain verbal input by the occupant. Known sentiment analysis algorithms may be used to map phrases (e.g., "I'm freezing," "it's too hot") to defined affect states $s_t$ such as, for example, {negative, neutral, positive}. At block 330, the parameters from the manual actions, obtained at block 320, and sentiment analysis, performed at block 325, are used to compile human influence factors (HIF). The HIF, at block 330, may additionally include parameters from an occupant profile 220 for the given occupant. Those parameters may include physiological parameters, habits, or updated preferences that are obtained during each use of the adaptive personal thermal system 110 for the given adaptive personal thermal device 125 and given occupant.

In addition to parameters that are part of system influence factors (SIF), from block 310, and parameters that are part of human influence factors (HIF), from block 330, parameters that are part of context influence factors (CIF), from block 340, are also obtained as states $s_t$ in order to determine the QoX score at block 210. CIF may generally be thought of as states $s_t$ that are not specific to the given occupant. Exemplary parameters may pertain to the physical context of the drive (e.g., weather and traffic conditions), temporal context (e.g., day, month, time), economic context (e.g., trip cost from an energy perspective), social context (e.g., number of passengers), or task context (e.g., manual control, which may cause driver distraction and affect perceived quality).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle, the system comprising:
   a personal thermal device, the personal thermal device providing heating or cooling to an individual occupant of the vehicle; and
   a controller implementing reinforcement learning to control the personal thermal device, the controller being configured to obtain states, from one or more sensors, indicating current conditions, to obtain a score that is determined according to the states and that represents a reward used in the reinforcement learning, and to provide a stochastic policy indicating a probability of taking a particular action to control the personal thermal device based on the score acting as a feedback for feedback control of the personal thermal device using the reinforcement learning, wherein the states include human influence factors (HIF) determined according to manual adjustments of the personal thermal device by the occupant and according to sentiment analysis of verbal and non-verbal feedback provided by the occupant, system influence factors (SIF) that are parameters affecting a temperature experienced by the occupant, and context influence factors (CIF) that are not specific to the occupant, wherein the sentiment analysis includes mapping verbal expressions to defined affect states and wherein the defined affect states include positive, neutral and negative.

2. The system according to claim 1, wherein the states that are determined according to the manual actions include time lapse or duration since adjustments made manually by the occupant to the personal thermal device or time lapse or duration since entry into or start of the vehicle by the occupant.

3. The system according to claim 1, wherein the states that are determined according to the sentiment analysis include an affect of the occupant determined by using a camera directed at a face of the occupant or a microphone recording a voice of the occupant or biometrics of the occupant.

4. The system according to claim 1, wherein the controller is configured to obtain the score by mapping the states to the score using a mapping function that is developed via machine learning.

5. The system according to claim 4, wherein the controller is configured to additionally use a user profile specific to the occupant to obtain the score.

6. The system according to claim 1, wherein the personal thermal device is a heated or vented seat in which the occupant is seated.

7. The system according to claim 1, wherein the occupant is a driver of the vehicle and the personal thermal device is a heated or cooled steering wheel.

8. A non-transitory computer-readable medium that stores instructions which, when processed by one or more processors, implement a method in a vehicle, the method comprising:
obtaining states, from one or more sensors, indicating current conditions, wherein obtaining the states include obtaining states of human influence factors (HIF) determined according to manual adjustments of the personal thermal device by the occupant and according to sentiment analysis of verbal and non-verbal feedback provided by the occupant, system influence factors (SIF) that are parameters affecting a temperature experienced by the occupant, and context influence factors (CIF) that are not specific to the occupant;
obtaining a score that is determined according to the states and that represents a reward;
performing reinforcement learning to control a personal thermal device, wherein the personal thermal device provides heating or cooling to an individual occupant of the vehicle and the reward is used in the reinforcement learning; and
providing a stochastic policy indicating a probability of taking a particular action to control the personal thermal device based on the score acting as a feedback for feedback control of the personal thermal device using the reinforcement learning, wherein the sentiment analysis includes mapping verbal expressions to defined affect states and wherein the defined affect states include positive, neutral and negative.

9. The non-transitory computer-readable medium according to claim 8, wherein the obtaining the states that are HIF that are determined according to the manual actions includes obtaining time lapse or duration since adjustments made manually by the occupant to the personal thermal device or time lapse or duration since entry into or start of the vehicle by the occupant.

10. The non-transitory computer-readable medium according to claim 8, wherein the obtaining the states that are HIF that are determined according to the sentiment analysis includes obtaining an affect of the occupant determined by using a camera directed at a face of the occupant or a microphone recording a voice of the occupant or biometrics of the occupant.

11. The non-transitory computer-readable medium according to claim 8, wherein the obtaining the score includes mapping the states to the score using a mapping function that is developed via machine learning.

12. The non-transitory computer-readable medium according to claim 11, wherein the obtaining the score additionally includes using a user profile specific to the occupant.

13. The non-transitory computer-readable medium according to claim 8, wherein the personal thermal device is a heated or vented seat in which the occupant is seated.

14. The non-transitory computer-readable medium according to claim 8, wherein the occupant is a driver of the vehicle and the personal thermal device is a heated or cooled steering wheel.

15. The system of claim 1, wherein the verbal expressions include non-command verbal expressions.

16. The non-transitory computer-readable medium according to claim 8 verbal expressions include non-command verbal expressions.

* * * * *